US010068142B2

(12) United States Patent
Shimizu (10) Patent No.: US 10,068,142 B2
(45) Date of Patent: Sep. 4, 2018

(54) DETECTION APPARATUS, DETECTION METHOD, DRIVING ASSISTANCE APPARATUS, AND DRIVING ASSISTANCE METHOD (71) Applicant: TOYOTA JIDOSHA KABUSHIKI KAISHA, Toyota-shi, Aichi-ken (JP)

(72) Inventor: Hiroaki Shimizu, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 205 days.

(21) Appl. No.: 14/782,041

(22) PCT Filed: Apr. 3, 2013

(86) PCT No.: PCT/JP2013/060212
§ 371 (c)(1),
(2) Date: Oct. 2, 2015

(87) PCT Pub. No.: WO2014/162538
PCT Pub. Date: Oct. 9, 2014

(65) Prior Publication Data
US 2016/0042237 A1 Feb. 11, 2016

(51) Int. Cl.
H04N 5/232 (2006.01)
G06K 9/00 (2006.01)
G08G 1/16 (2006.01)
G06T 7/285 (2017.01)
G06T 7/136 (2017.01)

(52) U.S. Cl.
CPC .......... G06K 9/00805 (2013.01); G06T 7/136 (2017.01); G06T 7/285 (2017.01); G08G 1/166 (2013.01); H04N 5/23229 (2013.01); G06T 2207/10021 (2013.01); G06T 2207/30261 (2013.01)

(58) Field of Classification Search
CPC combination set(s) only.
See application file for complete search history.

(56) References Cited

U.S. PATENT DOCUMENTS

2007/0150196 A1* 6/2007 Grimm ................ B60T 7/22
 701/301
2011/0125372 A1* 5/2011 Ito ..................... B60R 21/0132
 701/45

(Continued)

FOREIGN PATENT DOCUMENTS

DE 19729960 A1 * 11/1998 ........... B60R 21/013
JP 2006-064653 A 3/2006

(Continued)

Primary Examiner — Janese Duley
(74) Attorney, Agent, or Firm — Sughrue Mion, PLLC (57) ABSTRACT A jump-out determination unit determines whether or not an object is approaching a travel direction of a vehicle based on movement information relating to movement of the object, the movement information having been acquired by a speed variation calculation unit after a pre-indication of that the object approaches the travel direction of the vehicle is detected by a jump-out pre-indication calculation unit of a detection apparatus. As a result, the sudden approach of the object toward the travel direction, which is difficult to determine solely from the movement information relating to the object, can be detected with improved precision.

4 Claims, 2 Drawing Sheets (56) References Cited

U.S. PATENT DOCUMENTS

| | | | | |
|---|---|---|---|---|
| 2013/0286205 A1* | 10/2013 | Okada | ............... | H04N 7/18 |
| | | | | 348/148 |
| 2014/0156164 A1* | 6/2014 | Schuberth | ........... | B60W 30/143 |
| | | | | 701/96 |
| 2014/0219505 A1 | 8/2014 | Kindo et al. | | |

FOREIGN PATENT DOCUMENTS

| | | | |
|---|---|---|---|
| JP | 2006-072439 A | 3/2006 | |
| JP | 2010-102437 A | 5/2010 | |
| JP | 2012-203884 A | 10/2012 | |
| JP | 2012-238185 A | 12/2012 | |
| WO | 2013/042205 A1 | 3/2013 | |

* cited by examiner

FIG. 1

DETECTION APPARATUS, DETECTION METHOD, DRIVING ASSISTANCE APPARATUS, AND DRIVING ASSISTANCE METHOD

TECHNICAL FIELD

An embodiment of the invention relates to a detection apparatus, a detection method, a driving assistance apparatus, and a driving assistance method for detecting an object approaching a vehicle.

BACKGROUND ART

An apparatus that detects an object such as a pedestrian approaching a vehicle has been proposed. Patent Document 1, for example, discloses an apparatus that obtains time series variation in a position and a movement speed of a pedestrian existing in front of a host vehicle based on image information, and predicts whether or not the pedestrian will jump out onto a road along which the host vehicle is traveling based on the obtained time series variation in the position and movement speed of the pedestrian.

Patent Document 1: Japanese Patent Application Publication No. 2010-102437

SUMMARY OF THE INVENTION

However, there is room for improvement in the precision with which an object approaching a travel direction is detected.

An embodiment of the invention has been designed in consideration of this problem, and an object thereof is to provide a detection apparatus, a detection method, a driving assistance apparatus, and a driving assistance method with which an object approaching a travel direction can be detected with improved precision.

An aspect of the invention is a detection apparatus including a pre-indication detection unit that detects an indication of that an object approaches a travel direction of a vehicle, a movement information acquisition unit that acquires movement information, which is information relating to movement of the object, and an approach determination unit that determines whether or not the object is approaching the travel direction of the vehicle based on the movement information that is acquired by the movement information acquisition unit after the pre-indication detection unit detects the pre-indication.

According to this configuration, the approach determination unit determines whether or not the object is approaching the travel direction of the vehicle based on the movement information, which is information relating to the movement of the object and is obtained by the movement information acquisition unit after the pre-indication detection unit detects the pre-indication of that the object approaches the travel direction of the vehicle. As a result, the sudden approach of the object toward the travel direction, which is difficult to determine solely from the movement information relating to the object, can be detected with improved precision.

In this case, the approach determination unit can determine that the object is approaching the travel direction of the vehicle when a speed of the object in an approaching direction relative to the travel direction of the vehicle, the speed being included in the movement information acquired by the movement information acquisition unit, increases between a point at which the pre-indication is detected by the pre-indication detection unit and a first time following detection of the pre-indication by the pre-indication detection unit.

According to this configuration, the approach determination unit determines that the object is approaching the travel direction of the vehicle when the speed of the object in the approaching direction relative to the travel direction of the vehicle, which is included in the movement information acquired by the movement information acquisition unit, increases between the point at which the pre-indication is detected by the pre-indication detection unit and the first time following detection of the pre-indication by the pre-indication detection unit. Therefore, the sudden approach of the object toward the travel direction is detected from a speed increase relating to the pre-indication. As a result, a further improvement in the detection precision can be achieved.

In this case, the approach determination unit preferably determines that the object is approaching the travel direction of the vehicle when the speed of the object in the approaching direction relative to the travel direction of the vehicle, the speed being included in the movement information acquired by the movement information acquisition unit, exceeds a threshold before the first time following detection of the pre-indication by the pre-indication detection unit.

According to this configuration, the approach determination unit determines that the object is approaching the travel direction of the vehicle when the speed of the object in the approaching direction relative to the travel direction of the vehicle, which is included in the movement information acquired by the movement information acquisition unit, exceeds the threshold before the first time following detection of the pre-indication by the pre-indication detection unit. By setting the threshold appropriately so that the speed increase relating to the pre-indication is determined more quantitatively, a balance can be obtained between the detection sensitivity and the frequency of erroneous detections.

In this case, the approach determination unit can determine whether or not the object is approaching the travel direction of the vehicle using the threshold, which is set to be lower as a time of the increase in the speed of the object in the approaching direction relative to the travel direction of the vehicle, the speed being included in the movement information acquired by the movement information acquisition unit, approaches a second time set to be earlier than the first time following detection of the pre-indication by the pre-indication detection unit.

According to this configuration, the approach determination unit determines whether or not the object is approaching the travel direction of the vehicle using the threshold, which is set to be lower as the time of the increase in the speed of the object in the approaching direction relative to the travel direction of the vehicle, which is included in the movement information acquired by the movement information acquisition unit, approaches the second time set to be earlier than the first time following detection of the pre-indication by the pre-indication detection unit. Therefore, by setting the second time as a statistical period between a point at which the pedestrian exhibits the pre-indication and a sudden movement by the pedestrian, for example, the sudden approach of the object can be detected with even greater precision.

A further aspect of the invention is a detection method including a pre-indication detection step in which a pre-indication of that an object approaches a travel direction of a vehicle is detected, a movement information acquisition step in which movement information, which is information relating to movement of the object, is acquired, and an approach determination step in which a determination as to whether or not the object is approaching the travel direction of the vehicle is made based on the movement information that is acquired in the movement information acquisition step after the pre-indication is detected in the pre-indication detection step.

A further aspect of the invention is a driving assistance apparatus including a pre-indication detection unit that detects a pre-indication of that an object approaches a travel direction of a vehicle, a movement information acquisition unit that acquires movement information, which is information relating to movement of the object, an approach determination unit that determines whether or not the object is approaching the travel direction of the vehicle based on the movement information that is acquired by the movement information acquisition unit after the pre-indication detection unit detects the pre-indication, and a driving assistance unit that implements driving assistance on the vehicle based on the determination made by the approach determination unit.

According to this configuration, the approach determination unit can determine the sudden approach of the object toward the travel direction, which is difficult to determine solely from the movement information relating to the object, with improved precision. Accordingly, the driving assistance unit can implement more effective driving assistance in response to the approach of the object toward the travel direction by implementing driving assistance on the vehicle based on the determination made by the approach determination unit.

In this case, when the approach determination unit determines that the object is approaching the travel direction of the vehicle, the driving assistance unit can promote implementation of the driving assistance on the vehicle to a greater extent than when the approach determination unit determines that the object is not approaching the travel direction of the vehicle.

According to this configuration, when the approach determination unit determines that the object is approaching the travel direction of the vehicle, the driving assistance unit promotes implementation of the driving assistance on the vehicle to a greater extent than when the approach determination unit determines that the object is not approaching the travel direction of the vehicle. Therefore, when the object approaches the travel direction of the vehicle such that driving assistance becomes more necessary, driving assistance can be executed appropriately.

Further, the approach determination unit can determine that the object is approaching the travel direction of the vehicle when a speed of the object in an approaching direction relative to the travel direction of the vehicle, which is included in the movement information acquired by the movement information acquisition unit, increases between a point at which the pre-indication is detected by the pre-indication detection unit and a first time following detection of the pre-indication by the pre-indication detection unit.

In this case, the approach determination unit can determine that the object is approaching the travel direction of the vehicle when the speed of the object in the approaching direction relative to the travel direction of the vehicle, the speed being included in the movement information acquired by the movement information acquisition unit, exceeds a threshold before the first time following detection of the pre-indication by the pre-indication detection unit.

In this case, the approach determination unit can determine whether or not the object is approaching the travel direction of the vehicle using the threshold, which is set to be lower as a time of the increase in the speed of the object in the approaching direction relative to the travel direction of the vehicle, the speed being included in the movement information acquired by the movement information acquisition unit, approaches a second time set to be earlier than the first time following detection of the pre-indication by the pre-indication detection unit.

Further, the driving assistance unit can promote implementation of the driving assistance on the vehicle to a greater extent as the time of the increase in the speed of the object in the approaching direction relative to the travel direction of the vehicle, the speed being included in the movement information acquired by the movement information acquisition unit, approaches the second time set to be earlier than the first time following detection of the pre-indication by the pre-indication detection unit.

According to this configuration, the driving assistance unit promotes implementation of the driving assistance on the vehicle to a greater extent as the time of the increase in the speed of the object in the approaching direction relative to the travel direction of the vehicle, which is included in the movement information acquired by the movement information acquisition unit, approaches the second time set to be earlier than the first time following detection of the pre-indication by the pre-indication detection unit. Therefore, by setting the second time as a statistical period between the point at which the pedestrian exhibits the pre-indication and a sudden movement by the pedestrian, for example, the promoted driving assistance can be executed more appropriately as the likelihood that the pedestrian will suddenly approach increases statistically.

A further aspect of the invention is a driving assistance method including a pre-indication detection step in which a pre-indication of that an object approaches a travel direction of a vehicle is detected, a movement information acquisition step in which movement information, which is information relating to movement of the object, is acquired, an approach determination step in which a determination as to whether or not the object is approaching the travel direction of the vehicle is made based on the movement information that is acquired in the movement information acquisition step after the pre-indication is detected in the pre-indication detection step, and a driving assistance step in which driving assistance is implemented on the vehicle based on the determination made in the approach determination step.

With the detection apparatus, detection method, driving assistance apparatus, and driving assistance method according to this embodiment of the invention, an object approaching a travel direction can be detected with improved precision.

MODES FOR CARRYING OUT THE INVENTION

Figure 1:
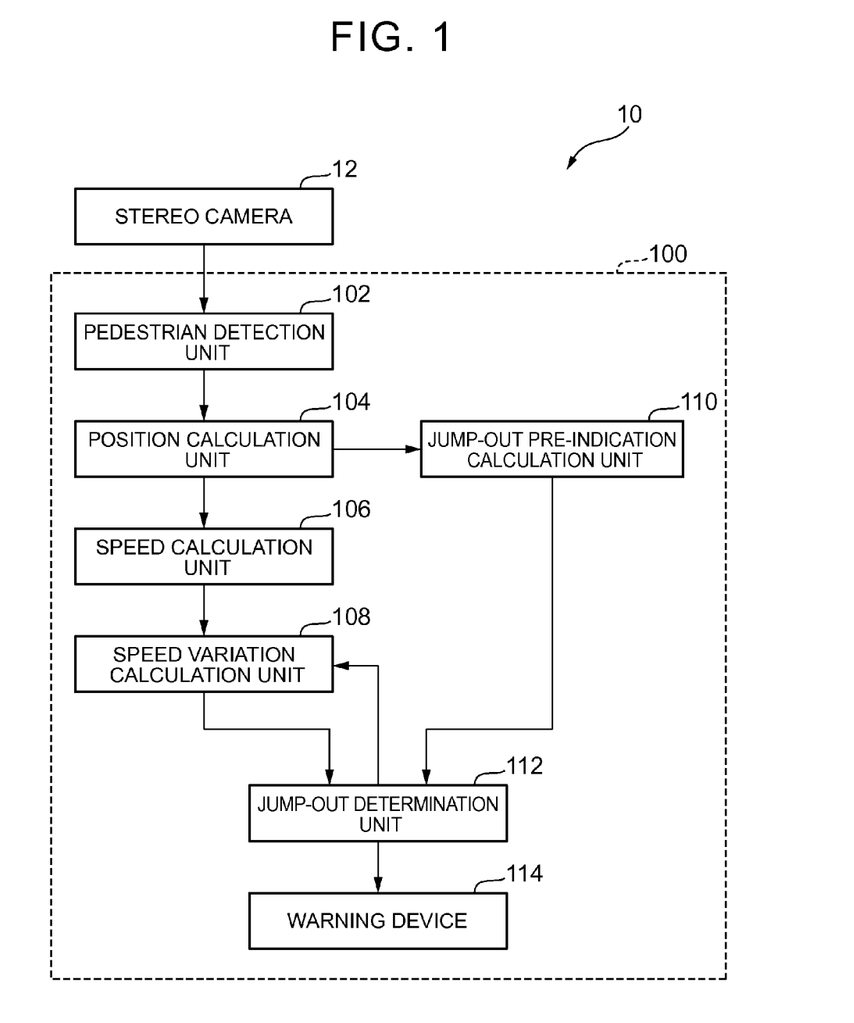
FIG. 1 is a block diagram showing a configuration of a detection apparatus according to an embodiment.

An example of a detection apparatus according to an embodiment of the invention will be described below with reference to the drawings. As shown in FIG. 1, a detection apparatus 10 is configured as a driving assistance apparatus that is installed in a vehicle in order to assist driving performed by a driver by detecting the approach of an object such as a pedestrian, a bicycle, or a motorcycle toward the vehicle. In the detection apparatus 10, a stereo camera 12 is connected to a general purpose personal computer (PC) 100.

The stereo camera 12 is constituted by two monocular cameras, for example, and captures images of the object from a plurality of different directions simultaneously. The reason for using the stereo camera 12 is to detect a movement direction of the pedestrian from distances differences in respective imaging directions. The stereo camera 12 may be exchanged for another sensor capable of detecting distances, such as a laser radar (a lidar). Further, a monocular camera may be used to detect a movement amount of the object in a lateral direction.

The general purpose PC 100 includes, as function blocks for executing processing to be described below using a predetermined program, a pedestrian detection unit 102, a position calculation unit 104, a speed calculation unit 106, a speed variation calculation unit 108, a jump-out pre-indication calculation unit 110, and a jump-out determination unit 112. The general purpose PC 100 also includes a warning device 114.

The pedestrian detection unit 102 detects the pedestrian or other object from an image captured by at least one of the plurality of monocular cameras constituting the stereo camera 12. A method of detecting the pedestrian or other object may be realized using a typical pattern matching method, for example.

The position calculation unit 104 calculates a position of the pedestrian or other object detected by the pedestrian detection unit 102, including a distance to the object, from a parallax in each imaging direction within a region of the object. The position calculation unit 104 can calculate the position of the object using a typical triangulation method.

The speed calculation unit 106 calculates an orientation D and a magnitude V of a speed of the object from differences in positions of the object calculated at time intervals by the position calculation unit 104. Associations between objects detected at time intervals can be made by selecting the object in the closest position to an object detected at a previous time from objects detected within a certain fixed distance at a subsequent time. Note that the speed calculation unit 106 can obtain a travel direction of the vehicle from a vehicle speed sensor and a steering angle sensor installed in the vehicle. The speed calculation unit 106 can calculate a speed component of the object in an approaching direction relative to the travel direction of the vehicle.

The speed variation calculation unit 108 determines whether or not at least one of the orientation D and the magnitude V of the speed of the object, calculated by the speed calculation unit 106, exceeds a set threshold. Further, the speed variation calculation unit 108 obtains a time at which either the orientation D or the magnitude V of the speed exceeds the threshold. Note that the speed variation calculation unit 108 can obtain a time at which the speed component of the object in the approaching direction relative to the travel direction of the vehicle exceeds a predetermined threshold. In this case, as will be described below, the threshold is modified in response to a command from the jump-out determination unit 112.

The jump-out pre-indication calculation unit 110 extracts the regions of the pedestrians or other objects detected respectively at the previous time and the following time and used by the speed calculation unit 106 to calculate the speed. The jump-out pre-indication calculation unit 110 converts the objects in the respective regions into characteristic amounts required to calculate a pre-indication of that the object jumping out (rapidly approaching the vehicle). The jump-out pre-indication calculation unit 110 determines the occurrence of the pre-indication of that the object jumping out from a difference between the characteristic amounts of the respective regions. The jump-out pre-indication calculation unit 110 also obtains the time at which the pre-indication occurs.

The jump-out determination unit 112 determines that the object has jumped out according to whether or not a time at which the speed variation calculation unit 108 determines that either the orientation D or the magnitude V of the speed has exceeded the threshold is included within a predetermined period from the time at which the jump-out pre-indication calculation unit 110 detects the pre-indication of that the object jumping out.

When the jump-out determination unit 112 determines that the object has jumped out, it is highly likely that the object has actually jumped out, and therefore the warning device 114 issues a warning to the driver of the vehicle. Note that in the detection apparatus 10 according to this embodiment, a volume of the warning issued by the warning device 114, a pitch of a warning sound, a length of the warning, an amount of information included in the warning, and a timing at which the warning is issued may be modified in accordance with the likelihood that the object has jumped out.

The warning device 114 may also provide the driver of the vehicle with information and instructions in the form of images and sounds. Further, a device that prompts the driver of the vehicle to perform appropriate operations by applying a predetermined reactive force or vibration to a steering wheel, an accelerator pedal, and a brake pedal of the vehicle based on the determination of the jump-out determination unit 112 may be provided. Furthermore, a device that intervenes in the operations performed by the driver of the vehicle in order to accelerate, decelerate, and steer the vehicle based on the determination of the jump-out determination unit 112 may be provided.

Figure 2:
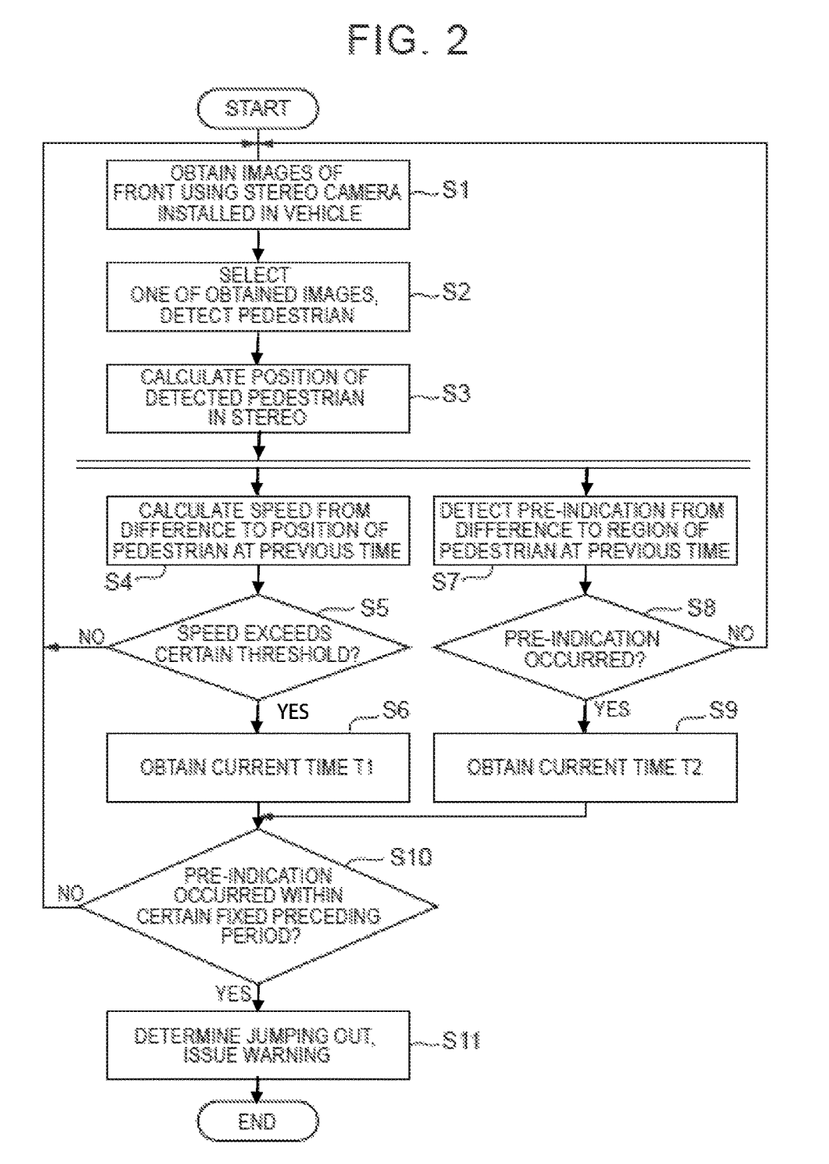
FIG. 2 is a flowchart showing an operation of the detection apparatus according to this embodiment.

An operation of the detection apparatus 10 according to this embodiment will be described below. As shown in FIG. 2, images of the front of the vehicle are obtained by the stereo camera 12 installed in the vehicle (S1). The pedestrian detection unit 102 detects an object such as a pedestrian from an image captured by at least one of the plurality of monocular cameras constituting the stereo camera 12 (S2). The method of detecting the pedestrian or other object may be realized using a typical pattern matching method, for example.

The position calculation unit 104 calculates the position of the pedestrian or other object detected by the pedestrian detection unit 102, including the distance to the object, from the parallax in each imaging direction within the region of the object (S3). The position calculation unit 104 can calculate the position of the object using a typical triangulation method.

The speed calculation unit 106 calculates the orientation D and the magnitude V of the speed of the object from differences in the positions of the object calculated at time intervals by the position calculation unit 104. Associations between objects detected at time intervals can be made by selecting the object in the closest position to an object detected at the previous time from objects detected within a certain fixed distance at the subsequent time (S4).

In this case, the speed calculation unit 106 can calculate a speed component |V| of the pedestrian or other object in the approaching direction relative to the travel direction of the vehicle by referencing the travel direction of the vehicle from the vehicle speed sensor and the steering angle sensor.

The speed variation calculation unit 108 determines whether or not at least one of the orientation D and the magnitude V of the speed of the object, calculated by the speed calculation unit 106, exceeds the set threshold (S5). When neither the orientation D nor the magnitude V of the speed exceeds the threshold, the general purpose PC 100 returns to the processing of S1 (S5). When the orientation D or the magnitude V of the speed exceeds the threshold (S5), the speed variation calculation unit 108 obtains a time T1 at which either the orientation D or the magnitude V of the speed exceeds the threshold (S6).

In this case, the speed variation calculation unit 108 can determine whether or not the speed component |V| of the pedestrian or other object in the approaching direction relative to the travel direction of the vehicle exceeds a threshold cc set as desired (S5). When the speed component |V| exceeds the threshold cc, the speed variation calculation unit 108 obtains the time T1 at which the speed component |V| exceeds the threshold $\alpha$ (S6). Note that the threshold $\alpha$ is modified as desired, as will be described below.

Meanwhile, in parallel with the processing of S4 to S6, the jump-out pre-indication calculation unit 110 extracts the regions of the pedestrians or other objects detected respectively at the previous time and the following time and used by the speed calculation unit 106 to calculate the speed. The jump-out pre-indication calculation unit 110 converts the objects in the respective regions into characteristic amounts required to calculate the pre-indication of that the object jumping out. The jump-out pre-indication calculation unit 110 then determines the occurrence of the pre-indication of that the object jumping out from the difference between the characteristic amounts of the respective regions (S7).

A method used by the jump-out pre-indication calculation unit 110 to detect the object jumping out will be described below. The jump-out pre-indication calculation unit 110 extracts the regions of the pedestrians or other objects detected respectively at the previous time and the following time and used by the speed calculation unit 106 to calculate the speed. The jump-out pre-indication calculation unit 110 then calculates variation in an outer appearance of the object from a Kullback-Leibler divergence between descriptors within frames of these predetermined time intervals.

The outer appearance of the object varies when the upper body of the pedestrian tilts in an advancement direction, the head of the pedestrian bends forward, the stride length of the pedestrian increases, the width between the legs of the pedestrian increases, and so on. Thus, sudden direction changes and so on by the pedestrian or the like can be detected. Next, an aperiodic sequence is detected using a smoothing method. In so doing, sudden acceleration and so on by the pedestrian or the like can be detected. This method can also be applied to cases where the object is a bicycle or a motorcycle rather than a pedestrian.

When the pre-indication of the object jumping out is not detected using the method described above, the general purpose PC 100 returns to the processing of S1 (S8). When the pre-indication to the object jumping out is detected (S8), on the other hand, the jump-out pre-indication calculation unit 110 obtains a time T2 at which the pre-indication occurs (S9).

The jump-out determination unit 112 determines that the object has jumped out (S10) when the time T1 at which the speed variation calculation unit 108 determines that either the orientation D or the magnitude V of the speed has exceeded the threshold is included within a period T$\beta$ serving as a predetermined threshold that extends from the time T2 at which the jump-out pre-indication calculation unit 110 detects the pre-indication of the object jumping out. In other words, the object is determined to have jumped out when T1−T2<T$\beta$. The reason for this is that the precision of the jumping out determination can be improved using the property of a variation in speed within a fixed period following the pre-indication of jumping out. Hence, a statistically obtained value can be used as the threshold T$\beta$ in this case.

Here, when the speed of the object varies following the time T2 at which the pre-indication occurs, the probability of the object actually jumping out is considered to increase up to a certain time following the time T2, reach a maximum value at a certain time following the time T2, and then decrease from the time at which the maximum value is reached.

In this embodiment, therefore, a time T$\gamma$ at which T2<T$\gamma$<T2+T$\beta$ is set. The time T$\gamma$ is the time at which the probability of the object jumping out reaches the maximum value when the speed of the object varies following the time T2 at which the pre-indication occurs, and can be determined statistically using a histogram or the like. The jump-out determination unit 112 sets the threshold $\alpha$ used by the speed variation calculation unit 108 to determine the speed component |V| of the object in the approaching direction relative to the travel direction of the vehicle to be lower as the time T1 at which the speed component |V| is detected approaches the time T$\gamma$. The speed calculation unit 106 determines the speed component |V| (S5) and obtains the time T1 (S6) using the threshold $\alpha$ set in this manner. Hence, as the time T$\gamma$ at which the object is statistically most likely to jump out following the pre-indication occurs, variation in the speed of the object can be detected more easily, making it easier to detect the object jumping out.

When the jump-out determination unit 112 determines that the object has jumped out, it is highly likely that the object has actually jumped out, and therefore the warning device 114 issues a warning to the driver of the vehicle (S11). In this case, the warning device 114 may increase the volume of the warning, the pitch of the warning sound, the length of the warning, and the amount of information included in the warning, and advance the timing at which the warning is issued as the time T1 at which the speed component |V| is detected approaches the time T$\gamma$.

The warning device 114 can increase the amount of information and instructions issued to the driver of the vehicle via images and sound and advance the timing at which the information and instructions are issued as the time T1 at which the speed component |V| is detected approaches the time T$\gamma$. Further, a device that increases the reactive force or vibration applied to the steering wheel, accelerator pedal, and brake pedal of the vehicle and advances the timing at which the reaction force and vibration are applied as the time T1 at which the speed component |V| is detected approaches the time T$\gamma$ may be provided. Furthermore, a device that increases the amount by which the vehicle is accelerated, decelerated, and steered by intervening in the operations performed by the driver of the vehicle and advances the timing at which the vehicle is accelerated, decelerated, and steered as the time T1 at which the speed component |V| is detected approaches the time T$\gamma$ may be provided.

In this embodiment, the jump-out determination unit 112 determines whether or not the object is approaching the travel direction of the vehicle based on movement information relating to movement of the object, which is obtained by the speed variation calculation unit 108 after the jump-out pre-indication calculation unit 110 of the detection apparatus 10 detects the pre-indication of that the object approaches the travel direction of the vehicle. Hence, the sudden approach of the object toward the travel direction of the vehicle, which is difficult to determine solely from the movement information relating to the object, can be detected with improved precision.

The jump-out determination unit 112 determines that the object is approaching the travel direction of the vehicle when the speed of the object in the approaching direction relative to the travel direction of the vehicle, which is included in the movement information obtained by the speed variation calculation unit 108, increases between a point at which the pre-indication is detected by the jump-out pre-indication calculation unit 110 and the time T2+Tβ following detection of the pre-indication by the jump-out pre-indication calculation unit 110. Hence, the sudden approach of the object toward the travel direction is detected from a speed increase relating to the pre-indication. As a result, a further improvement in the detection precision can be achieved.

The jump-out determination unit 112 determines that the object is approaching the travel direction of the vehicle when the speed component |V| of the object in the approaching direction relative to the travel direction of the vehicle, which is included in the movement information obtained by the speed variation calculation unit 108, exceeds the threshold α before the time T2+Tβ following detection of the pre-indication by the jump-out pre-indication calculation unit 110. By setting the threshold appropriately so that the speed increase relating to the pre-indication is determined more quantitatively, a balance can be obtained between the detection sensitivity and the frequency of erroneous detections.

The jump-out determination unit 112 determines whether or not the object is approaching the travel direction of the vehicle using the threshold c', which is set to be lower as the time T1 of the increase in the speed of the object in the approaching direction relative to the travel direction of the vehicle, which is included in the movement information obtained by the speed variation calculation unit 108, approaches the time Tγ set to be earlier than the time T2+Tβ following detection of the pre-indication by the jump-out pre-indication calculation unit 110. Therefore, by setting the time Tγ as a statistical period between the point at which the pedestrian exhibits the pre-indication and a sudden movement by the pedestrian, for example, the sudden approach of the object can be detected with even greater precision.

The jump-out determination unit 112 can determine the sudden approach of the object toward the travel direction of the vehicle, which is difficult to determine solely from the movement information relating to the object, with improved precision. Accordingly, the warning device 114 can implement more effective driving assistance in response to the approach of the object toward the travel direction by implementing driving assistance on the vehicle based on the determination made by the jump-out determination unit 112.

When the jump-out determination unit 112 determines that the object is approaching the travel direction of the vehicle, the warning device 114 promotes implementation of the driving assistance on the vehicle to a greater extent than when the jump-out determination unit 112 determines that the object is not approaching the travel direction of the vehicle. Therefore, when the object approaches the travel direction of the vehicle such that driving assistance becomes more necessary, driving assistance can be executed appropriately.

The warning device 114 promotes implementation of the driving assistance on the vehicle to a greater extent as the time T1 of the increase in the speed of the object in the approaching direction relative to the travel direction of the vehicle, which is included in the movement information obtained by the speed variation calculation unit 108, approaches the time Tγ set to be earlier than the time T2+Tβ following detection of the pre-indication by the jump-out pre-indication calculation unit 110. Therefore, by setting the time Tγ as a statistical period between the point at which the pedestrian exhibits the pre-indication and a sudden movement by the pedestrian, for example, the promoted driving assistance can be executed more appropriately as the likelihood that the pedestrian will suddenly approach increases statistically.

The invention is not limited to the embodiment described above, and may be implemented in various other embodiments. In the above embodiment, the threshold cc used to determine variation in the speed of the object is reduced as the time T1 of the increase in the speed of the object approaches the statistically set time Tγ following the pre-indication. However, in this embodiment, the timing at which to determine whether or not the object has jumped out can be advanced by increasing a detection range of the stereo camera 12 as the time T1 of the increase in the speed of the object approaches the time Tγ following the pre-indication, for example.

Further, the driving assistance performed by having the warning device 114 issue a warning to the driver or the like is not limited to a form in which the condition where no driving assistance such as issuing a warning is performed at all is shifted to the condition where driving assistance such as issuing a warning is performed. This embodiment includes a form in which the condition where driving assistance such as issuing a warning is performed is switched to the condition where different driving assistance such as intervening in the operations of the driver is performed. This embodiment also includes a form in which the condition where driving assistance such as issuing a warning is performed is shifted to the condition where different driving assistance such as intervening in the operations of the driver is performed in addition to the warning or the like.

INDUSTRIAL APPLICABILITY

With the detection apparatus, detection method, driving assistance apparatus, and driving assistance method according to this embodiment of the invention, an object approaching a travel direction can be detected with improved precision.

10 detection apparatus
12 stereo camera
100 general purpose PC
102 pedestrian detection unit
104 position calculation unit
106 speed calculation unit
108 speed variation calculation unit
110 jump-out pre-indication calculation unit
112 jump-out determination unit
114 warning device

The invention claimed is:
1. A detection apparatus comprising:
a computer programmed to:
detect a pre-indication that an object approaches a travel direction of a vehicle;

in parallel with the pre-indication detection, determine whether a speed of the object exceeds a threshold $\alpha$ at predetermined time intervals;

acquire movement information, which is information relating to movement of the object; and determine whether or not the object is approaching the travel direction of the vehicle based on the movement information that is acquired after the pre-indication is detected, wherein the object is determined to be approaching the travel direction of the vehicle when the speed of the object in an approaching direction relative to the travel direction of the vehicle, the speed being included in the movement information that is acquired, increases between a time T2 when the pre-indication is detected and a time T2+Tβ following the time T2 of detection of the pre-indication, the object is determined to be approaching the travel direction of the vehicle when the speed of the object in the approaching direction relative to the travel direction of the vehicle, the speed being included in the movement information that is acquired, exceeds the threshold $\alpha$ at a time T1 before the time T2+Tβ following detection of the pre-indication, the object is determined to be approaching the travel direction of the vehicle using the threshold $\alpha$, which is set to be lower as a time of the increase in the speed of the object in the approaching direction relative to the travel direction of the vehicle, the speed being included in the movement information that is acquired, approaches a time Tγ that is earlier than the time T2+Tβ following detection of the pre-indication, so that T2<Tγ<T2+Tβ, wherein, when the speed of the object varies after the time T2 of the pre-indication detection, the probability of the object jumping out is determined, based on a histogram, to increase until the time Tγ after the time T2 of the pre-indication detection, reach a maximum value at the time Tγ following the time T2 of the pre-indication detection, and then decrease from the time Tγ; and after the time T2 of the pre-indication detection, lower the threshold $\alpha$ as the time T1 approaches the time Tγ of when the probability of the object jumping out reaches the maximum value.

2. A driving assistance apparatus comprising:

a computer programmed to:

detect a pre-indication that an object approaches a travel direction of a vehicle;

in parallel with the pre-indication detection, determine whether a speed of the object exceeds a threshold $\alpha$ at predetermined time intervals;

acquire movement information, which is information relating to movement of the object; and determine whether or not the object is approaching the travel direction of the vehicle based on the movement information that is acquired after the pre-indication is detected, implement driving assistance on the vehicle based on the determination of whether or not the object is approaching the travel direction of the vehicle based on the movement information, wherein the object is determined to be approaching the travel direction of the vehicle when the speed of the object in an approaching direction relative to the travel direction of the vehicle, the speed being included in the movement information that is acquired, increases between a time T2 when the pre-indication is detected and a time T2+Tβ following the time T2 of detection of the pre-indication, the object is determined to be approaching the travel direction of the vehicle when the speed of the object in the approaching direction relative to the travel direction of the vehicle, the speed being included in the movement information that is acquired, exceeds the threshold $\alpha$ at a time T1 before the time T2+Tβ following detection of the pre-indication, the computer is further programmed to determine whether or not the object is approaching the travel direction of the vehicle using the threshold $\alpha$, which is set to be lower as a time of the increase in the speed of the object in the approaching direction relative to the travel direction of the vehicle, the speed being included in the movement information that is acquired, approaches a time Tγ that is earlier than the time T2+Tβ following detection of the pre-indication, so that T2<Tγ<T2+Tβ, wherein, when the speed of the object varies after the time T2 of the pre-indication detection, the probability of the object jumping out is determined, based on a histogram, to increase until the time Tγ after the time T2 of the pre-indication detection, reach a maximum value at the time Tγ following the time T2 of the pre-indication detection, and then decrease from the time Tγ; and after the time T2 of the pre-indication detection, lower the threshold $\alpha$ as the time T1 approaches the time Tγ of when the probability of the object jumping out reaches the maximum value.

3. The driving assistance apparatus according to claim 2, wherein when the computer determines that the object is approaching the travel direction of the vehicle, the implementation of the driving assistance on the vehicle is implemented to a greater extent than when the computer determines that the object is not approaching the travel direction of the vehicle.

4. A driving assistance apparatus comprising:

a computer programmed to:

detect a pre-indication that an object approaches a travel direction of a vehicle;

in parallel with the pre-indication detection, determine whether a speed of the object exceeds a threshold $\alpha$ at predetermined time intervals;

acquire movement information, which is information relating to movement of the object; and implement driving assistance on the vehicle based on the determination of whether the object is approaching the travel direction of the vehicle based on the movement information, determine that the object is approaching the travel direction of the vehicle when the speed of the object in the approaching direction relative to the travel direction of the vehicle, the speed being included in the movement information that is acquired, increases between time T2 when the pre-indication is detected and a time T2+Tβ following the time T2 of detection of the pre-indication, and promote implementation of the driving assistance on the vehicle to a greater extent as a time of the increase in the speed of the object in the approaching direction relative to the travel direction of the vehicle, the speed being included in the movement information that is acquired, approaches a time Tγ that is earlier than the time T2+Tβ following detection of the pre-indication, so that T2<Tγ<T2+Tβ,
  wherein, when the speed of the object varies after the time T2 of the pre-indication detection, the probability of the object jumping out is determined, based on a histogram, to increase until the time Tγ after the time T2 of the pre-indication detection, reach a maximum value at the time Tγ following the time T2 of the pre-indication detection, and then decrease from the time Tγ; and
after the time T2 of the pre-indication detection, lower the threshold α as the time Tγ, of when the probability of the object jumping out reaches the maximum value, approaches.

\* \* \* \* \*